UNITED STATES PATENT OFFICE.

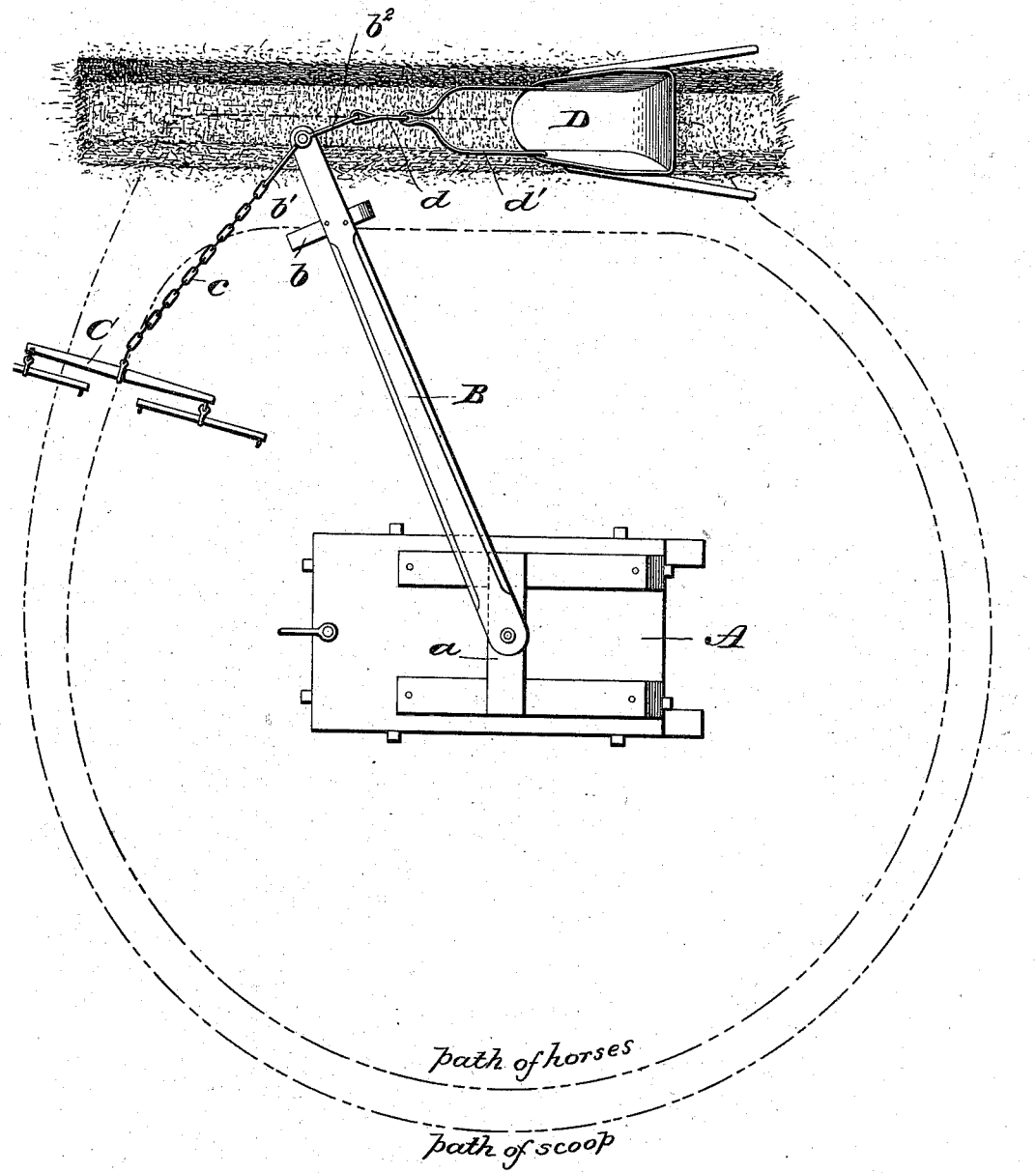

CHARLES W. BILLINGS, OF CARROLL, INDIANA.

APPARATUS FOR DIGGING DITCHES.

SPECIFICATION forming part of Letters Patent No. 557,949, dated April 7, 1896.

Application filed February 6, 1896. Serial No. 578,218. (No model.)

*To all whom it may concern:*

Be it known that I, CHARLES W. BILLINGS, a citizen of the United States of America, residing at Carroll, in the county of Carroll and State of Indiana, have invented certain new and useful Improvements in Apparatus for Digging Ditches; and I do hereby declare the following to be a full, clear, and exact description of the invention, such as will enable others skilled in the art to which it appertains to make and use the same, reference being had to the accompanying drawing, and to letters of reference marked thereon, which forms a part of this specification.

The object of this invention is to provide an apparatus for digging ditches, comprising an ordinary scoop or scraper which is flexibly connected to a sweep, said sweep being pivoted at its inner end to a sled or drag which is suitably staked or anchored to the ground, a single or double tree being flexibly connected to the sweep at or near the point of connection of the scraper thereto, and by the peculiar arrangement of the parts a straight ditch can be dug or excavated and the dirt dumped at a considerable distance therefrom, the horses walking within the path of the scoop or scraper and around the sled.

The invention consists in the arrangement and combination of the parts, as will be hereinafter fully set forth, and particularly pointed out in the claims.

In the accompanying drawing I have illustrated my invention by a plan view.

A designates a sled or drag which is adapted to be securely anchored or fastened in position by stakes or other suitable means, and this sled or drag is provided with a superstructure comprising in part a cross-bar $a$, to which one end of a sweep B is pivoted, said sweep carrying near its outer end a shoe $b$. To the outer or free end of the sweep are attached clevises $b'$ and $b^2$, and to the clevis $b'$ is connected a chain $c$, of sufficient length, to which is coupled a doubletree C. The chain $c$ is preferably not less than one-third nor more than one-half of the length of the sweep B, for the purpose hereinafter set forth.

To the clevis $b^2$ is connected a link or swivel $d$, which is also connected to the bail $d'$ of an ordinary scoop or scraper D, said scraper being provided with the usual handles for properly manipulating the same.

In operation the sled or drag A is staked or otherwise anchored at the proper distance from the place where the ditch is to be dug, the distance being determined by the length of the sweep B. After the sled has been anchored the draft mechanism and scraper are connected to the outer end of the sweep, as hereinbefore described, and the horses are driven around the sled, the scraper being manipulated to remove dirt from a straight section and dump it beyond the path of the horses and at a considerable distance from the ditch. By providing the chain or flexible connection $c$ the horses are permitted to walk for a short distance parallel with the ditch and between said ditch and the sled or drag, while the flexible connection between the sweep and scraper allows said scraper to follow the line of the ditch, as hereinbefore mentioned and as indicated in the drawing. When a section of the ditch is dug to the desired depth, the sled or drag is advanced and the operation repeated.

By means of the apparatus hereinbefore described I provide an efficient manner of applying horse-power to the scraper.

Having thus described my invention, what I claim as new, and desire to secure by Letters Patent, is—

1. The combination with a sled or drag adapted to be staked or anchored to the ground, of a sweep pivoted to said sled or drag, together with a scraper flexibly connected to the outer end of the sweep, and draft mechanism having a chain or flexible connection which is also attached to the outer end of the sweep, substantially as shown and for the purpose set forth.

2. The combination with a sled or drag having means for anchoring the same to the ground, of a sweep B pivoted at its inner end to said sled or drag, clevises $b'$ and $b^2$ pivoted to the outer end of the sweep, a scoop or scraper D connected to the clevis $b^2$ by an interposed link, and draft mechanism C connected to the clevis $b'$ by a chain or flexible connection $c$, substantially as shown and for the purpose set forth.

In testimony whereof I affix my signature in presence of two witnesses.

CHARLES W. BILLINGS.

Witnesses:
ABRAM W. EIKENBERRY,
JOSEPH STUDEBAKER.